United States Patent [19]

Crochet, Sr.

[11] 4,077,234

[45] Mar. 7, 1978

[54] COUPLING APPARATUS

[76] Inventor: Gerald J. Crochet, Sr., 508 Beverly Dr., Lafayette, La. 70501

[21] Appl. No.: 662,036

[22] Filed: Feb. 27, 1976

[51] Int. Cl.² ............................................. B62D 53/00
[52] U.S. Cl. .............................. 64/17 R; 280/478 R; 280/508
[58] Field of Search .......................... 64/17 SP, 17 R; 403/102; 280/508, 478 R, 509, 474, 477

[56] References Cited

U.S. PATENT DOCUMENTS

| 2,666,653 | 1/1954 | Diuble | 280/508 |
| 2,976,061 | 3/1961 | Embree | 280/509 |
| 3,981,517 | 7/1976 | Crochet | 280/478 R |

*Primary Examiner*—Benjamin W. Wyche
*Assistant Examiner*—R. C. Turner
*Attorney, Agent, or Firm*—Bill B. Berryhill

[57] ABSTRACT

Coupling apparatus for coupling first and second objects together and including first and second coupling means carried by respective ones of said objects. The first coupling means comprises a latch carrying member and latch control means telescopic therewith. A guide means is carried by the latch carrying member and first latch means are slidably mounted on the guide means. The first latch means are movable along one path from a first latch position to a second latch position, whereby they automatically engage second latch means on the second coupling means, upon movement of the latch control means along another path transverse to that of the first latch means. The apparatus also comprises an improved universal joint control assembly for selectively locking or freeing an associated universal joint. The universal joint control assembly comprises a housing rigidly attached to the first object and at least partially surrounding the joint and having an open end for relative extension and retraction of the joint and housing.

24 Claims, 9 Drawing Figures

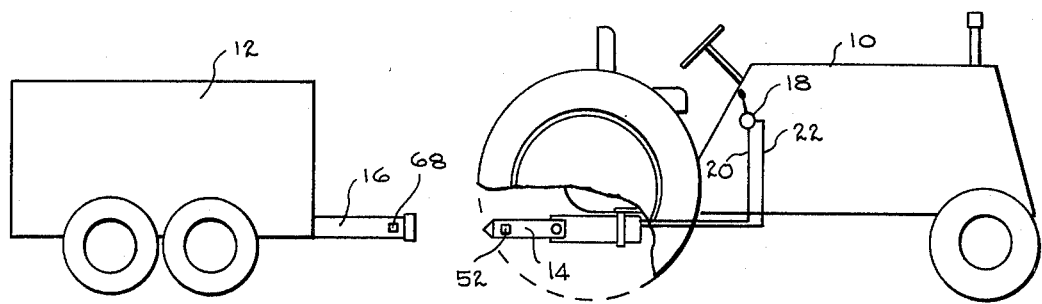
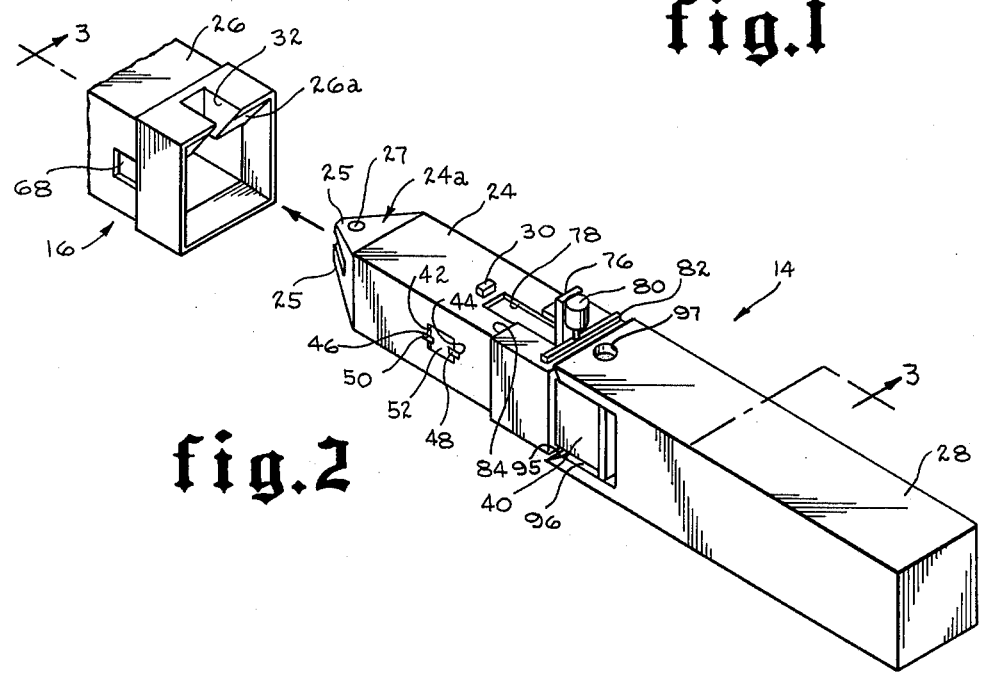
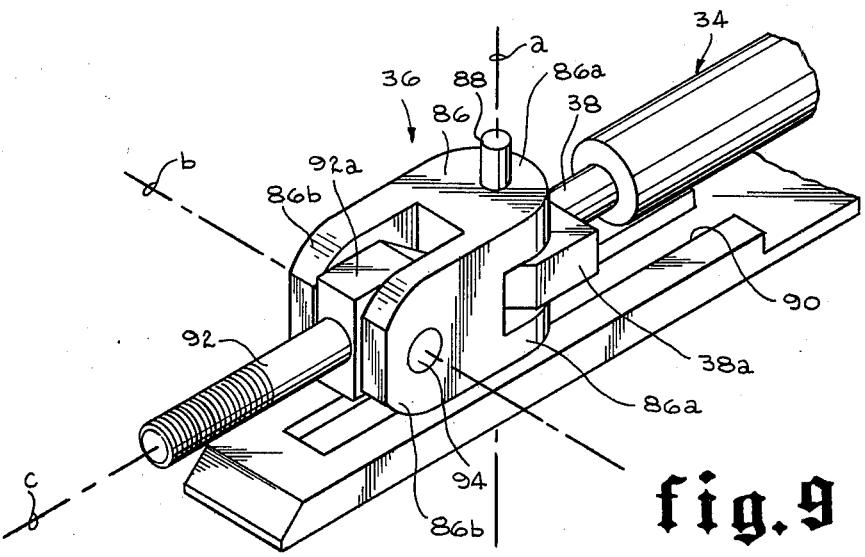

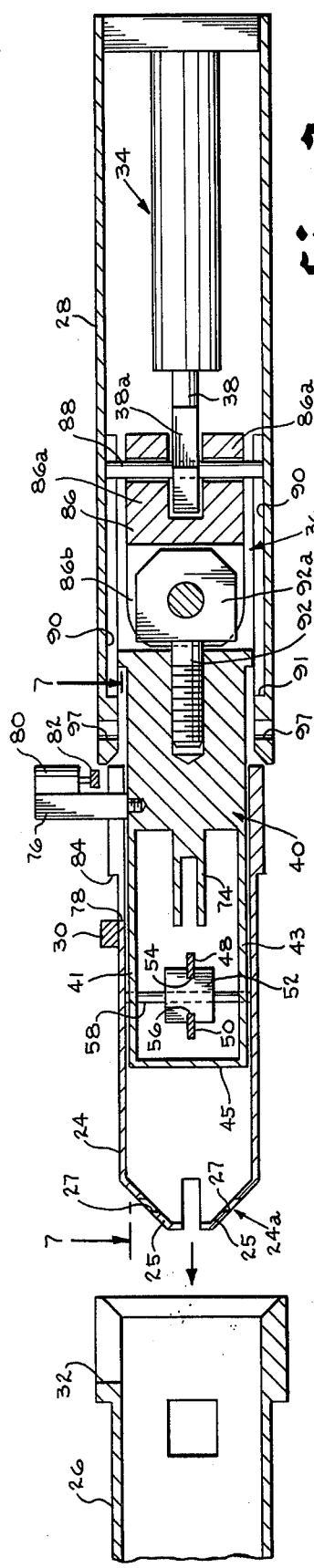

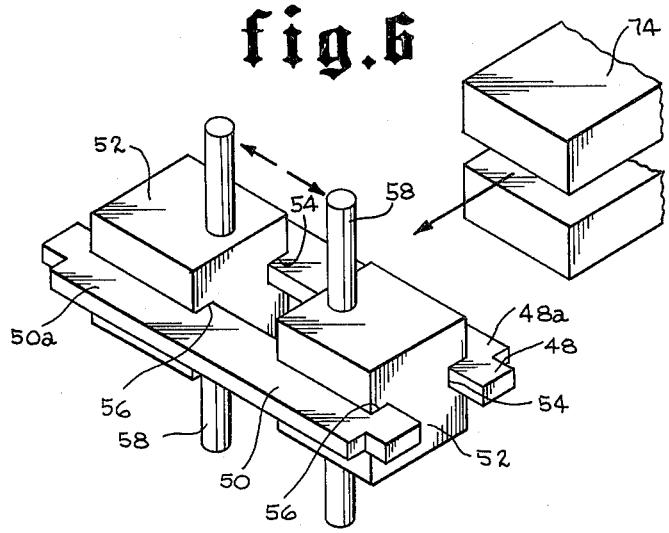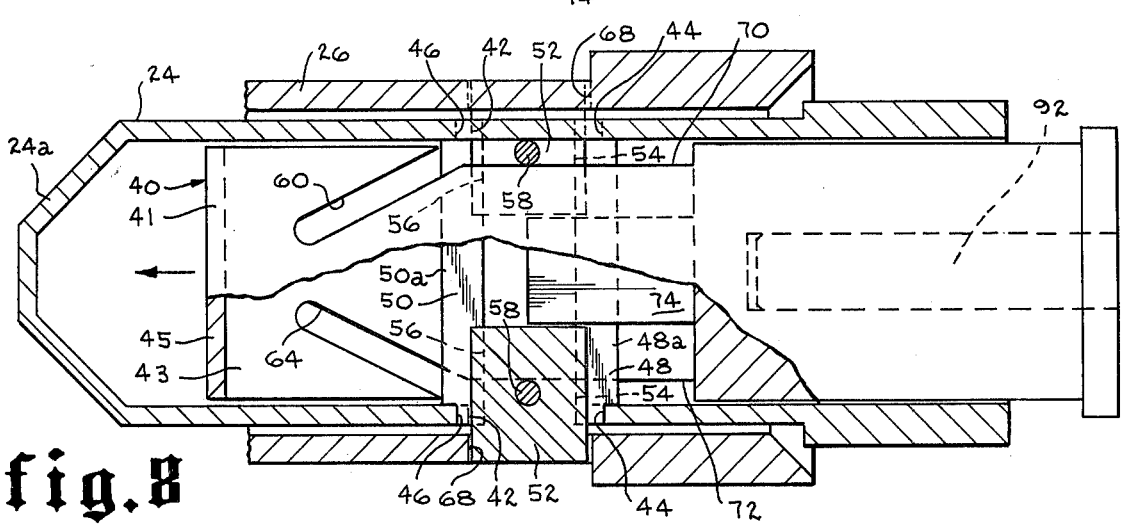

COUPLING APPARATUS

BACKGROUND OF THE INVENTION

1. Field of the Invention

The present invention pertains to coupling apparatus for coupling two objects together in tandem. For example, the apparatus may be used to couple a trailer to a tractor, to couple several trailers to one another, to couple a floating vessel to another or to a dock, etc. In particular, the invention pertains to an improved "one point" type coupling as opposed to a two or three point coupling. Such apparatus generally comprises two main portions or coupling means each of which is carried by a respective one of the two objects.

In such applications, it is highly desirable and, in most cases, necessary that the coupling apparatus provide for universal movement between the two objects, i.e. for relative pivoting about three generally mutually perpendicular axes. For example, where a trailer or other vehicle is being drawn by a tractor or other prime mover, it must be able to pivot about a generally vertical axis so as to follow the tractor as it turns corners, to pivot about a generally transverse horizontal axis so as to ride over bumps and concavities in the road or ground on which it is traveling, and to pivot about a generally longitudinal horizontal axis so as to permit rocking movement where the road or ground is uneven. Similar movements must be permitted between a floating vessel and another vessel or a dock to allow one vessel to follow the other and/or to allow the vessel to move with the wave action of the water.

Another highly desirable feature of coupling apparatus of the type described above is that it should be possible for coupling and uncoupling to be carried out by a single operator. Furthermore, the operator should be able to couple and uncouple the two objects automatically without the necessity of leaving his position, as in the driver's seat of the tractor, and/or of directly manually handling the coupling means.

2. Description of the Prior Art

My copending application Ser. No. 550,854, filed Feb. 18, 1975, now U.S. Pat. No. 3,981,517, and which is a continuation-in-part of my prior U.S. Pat. No. 3,866,948, discloses several embodiments of coupling apparatus of the type described above which achieve the objects of universal movement and automatic latching. In each of these two embodiments there is, in the first coupling means on the first object, an extendable mechanism which is longitudinally extendable and retractable with respect to the first object by drive means such as a double acting hydraulic piston and cylinder. The latching means includes a pair of dogs carried by the extendable mechanism and each integrally attached to a pivotable cam plate. A latch control means on the extendable mechanism may be extended away from the first object by the drive means separately from the remainder of the extendable mechanism, and this extension causes pivoting of the cam plates to move the dogs laterally outwardly and into mating apertures in the second coupling means. When the dogs and apertures are engaged, the latch control means is stopped aginst further individual extension so that further operation of the drive means extends the entire extendable mechanism as a unit. This effects uncovering of a universal joint so that it can pivot freely.

My prior coupling apparatus was designed primarily for use in applications in which the tractor or other prime mover was provided with an integral drawbar of the conventional type rigidly attached to the tractor as an integral part thereof. Consequently, the coupling means to be carried by the tractor is formed in such a way that it could be attached to such a drawbar. While this is an advantage in that it allows existing tractors and other prime movers to be easily converted for use of the coupling means, it is a disadvantage in that the resulting composite structure is somewhat bulky and inconvenient and may also be complicated by a larger number of parts than is strictly necessary.

Another problem with the above apparatus is that the lateral movement of the dogs is directed only by the cam plates in their pivotal movement. The cam plates in turn ride relatively freely between the latch control means and the remainder of the extendable mechanism and are not attached to either of these parts as firmly as might be desired. Thus, with the prior mechanism, there is a chance of dislodging and/or jamming of the cam plates and dogs and of misalignment of the dogs with the apertures into which they must pass, particularly if the cam plates should be accidentally bent. Furthermore, in at least some of the embodiments of the above apparatus, the cam plates and dogs are in an exposed position on the outside of the coupling means and thus vulnerable to jamming by dirt, damage through physical jarring, exposure to rain causing rust, etc.

Another problem with the above apparatus is that, once the latch means are engaged, the universal joint and its control assembly must be relatively extended by a distance substantially equal to the length of the universal joint in order to allow complete universal movement. Thus, the coupling apparatus is relatively large or bulky when the joint is in its free position, and where a hydraulic ram assembly is used as the drive means, requires a relatively large, long stroke ram.

SUMMARY OF THE INVENTION

The present invention provides an improved coupling apparatus of the type generally disclosed in my copending application Ser. No. 550,854. The present invention also provides an improved universal joint control assembly, preferably an open-ended housing, which may be rigidly affixed directly to the tractor or the like in place of a conventional draw bar. The universal joint assembly may then be extended from or retracted into the interior of the housing by the drive means which is disposed in the housing. This arrangement is more compact, more effective, easier to manufacture and assemble, more convenient to use, and is simplified by the reduction of the number of component parts. The housing, with the enclosed and connected parts, then becomes a "live drawbar" which may be activated to provide a universal movement and/or to effect latching. Furthermore, the housing and/or a part of the first coupling means connected thereto may be formed to define a clevis structure so that the housing or other part so formed may, if desired, be alternatively used as a conventional drawbar. In the case of the housing, this clevis-like structure, including the provision of opposed lateral openings in the housing continuous with its open end, may be used to allow full universal movement while a substantial portion of the joint is still disposed in the housing. The coupling means is thereby rendered more compact and the necessary stroke length of the ram assembly is shortened.

The present invention also includes an improved latching assembly which provides positive guidance of both the first latch means and the attached cam elements, which provides for sliding, non-pivotal movement of both the first latch means and cam elements, and which provides greater protection for the first latch means and cam elements.

The apparatus of the present invention comprises first and second coupling means carried respectively by the first and second objects to be coupled. The first coupling means comprises a latch carrying member and a latch control means mounted for telescopic movement with respect to the latch carrying member in a first path extending generally longitudinally with respect to the first object. Guide means are carried by the latch carrying member and first latch means are slidably mounted on the guide means for reciprocation in a second path generally transverse to the path of the latch control means. The first coupling means further includes linking means cooperative between the latch control means and the first latch means to move the latter along their path between a first latch position and a second latch position upon movement of the latch control means along its path. The drive means moves the latch control means in its path, and the second coupling means includes second latch means which automatically engage the first latch means as the latter are moved from their first position to their second position to effect coupling of the two objects.

The guide means provides a positive means for guiding the movement of the first latch means separate from the linking means and latch control means which actually cause the movement. Thus, the latch means are less likely to be dislodged or jammed or misaligned with any of the openings into which they must pass.

In a preferred embodiment of the invention, the latch control means comprises a rigid latch control element, and the first latch means comprises at least one male latch element such as a dog. The linking means in turn comprises a cam member extending between these two elements generally transversely to each of their respective paths. The cam member is connected to and movable with one of the two elements, while the other of the elements has an elongate slot slidably receiving the cam member. The slot is disposed generally in a plane parallel to each of the two paths and is inclined in that plane with respect to each path. As the latch control element moves along its path, the cam member slides along the inclined slot so that the latch element is correspondingly moved along its path. Thus, the latch element is controlled by non-pivotal movement of the cam member which in turn receives positive guidance via the slot in which it rides. This further reduces the possibility of jamming, dislodging, or misaligning of the various parts. Furthermore, this preferred arrangement allows the moving parts, including the cam member and latch element (in its first position) to be disposed within the latch carrying member where they are protected against dirt, physical shock, rain, etc. The preferred coupling apparatus is also easier to manufacture and assemble.

It is thus a principal object of the present invention to provide a coupling apparatus having an improved latching mechanism.

Another object of the invention is to provide a coupling apparatus including a universal joint control assembly rigidly affixed directly to an object to be coupled.

Still another object of the invention is to provide means for reciprocation of a latch means on a coupling device via a non-pivotal cam member.

A further object of the invention is to provide a more compact coupling means.

Yet another object of the invention is to provide improved means for protecting the latch means and cam members of a coupling means.

Other objects, features, and advantages of the present invention will be made apparent by the following description of a preferred embodiment, the drawings and the claims.

BRIEF DESCRIPTION OF THE DRAWINGS

FIG. 1 is a small scale elevational view of a tractor and trailer carrying respective coupling means in accord with the present invention;

FIG. 2 is a perspective view of the two coupling means prior to engagement;

FIG. 3 is a longitudinal sectional view taken on lines 3—3 of FIG. 2;

FIG. 4 is a view similar to that of FIG. 3 subsequent to engagement of the latching means;

FIG. 5 is a view similar to those of FIGS. 3 and 4 subsequent to freeing of the universal joint assembly;

FIG. 6 is a perspective view of the first latch means, guide means, cam members, and bracing means of the first coupling means;

FIG. 7 is an enlarged partial sectional view taken on lines 7—7 of FIG. 3 but with the latch carrying member disposed in the mating female member of the second coupling means;

FIG. 8 is a view similar to that of FIG. 7 with the parts in the positions shown in FIG. 4 and with parts broken away; and FIG. 9 is a perspective view of the universal joint assembly.

DESCRIPTION OF THE PREFERRED EMBODIMENT

Referring now to the drawings, FIG. 1 shows the coupling apparatus of the invention in a typical application, namely as used to couple a tractor 10 to a trailer 12 for travel in tandem. The coupling apparatus comprises two major portions, a first coupling means 14 carried on the tractor 10 adjacent the rear portion and a second coupling means 16 carried on the front of the trailer 12. As will be explained more fully below, the first coupling means 14 includes a double-acting hydraulic piston and cylinder assembly which serves as a drive means for operation of the latch control means and also for selectively locking and freeing the universal joint. Accordingly, a source of hydraulic fluid (not shown) is included on the tractor 10 and a valve 18 is disposed on the tractor with its handle within reach of an operator in the driver's seat 9. Two conduits 20 and 22 are connected to the valve 18 and extend to respective ends of the cylinder. By operation of the valve 18, hydraulic fluid is selectively directed to one end of the cylinder and vented from the other end by respective ones of the conduits 20 and 22 in a well known manner as more fully explained in my copending application Ser. No. 550,854. By moving the valve 18 to another position, the procedure may be reversed.

Referring now to FIGS. 2–5 it can be seen that the apparatus comprises a hollow male member 24 disposed rearwardmost on first coupling means 14 and a mating female member 26 opening forwardly of the trailer 12 on second coupling means 16. In the embodiment shown, female member 26 forms the entire second coupling means 16. However, the second coupling means could be modified to include other parts such as a tongue disposed between the member 26 and trailer 12 to support member 26. To place the coupling means in alignment for coupling, the tractor 10 is backed toward the trailer 12 so that the male member 24 is advanced into the female member 26. The rear or free end 24a of member 24 is tapered as shown so as to cam the male and female members 24 and 26 into perfect alignment during this advancement. Female member 26 is provided with a forwardly projecting upper wall 26a which is bevelled on its inner surface to further assist in guiding the members 24 and 26 into alignment. The side and lower edges of member 26 adjacent the open front end may also be bevelled for like reason. Rear end 24a is also formed so as to define a clevis structure. In particular, it has upper and lower limbs 25 with respective aligned apertures 27 extending vertically therethrough. Thus the rear end 24a of the male member 24 can be used as a conventional drawbar.

A first stop member in the form of an upstanding lug 30 rigidly affixed to the top of member 24 passes into a forwardly opening notch 32 in member 26 as member 24 is advanced into member 26. Lug 30 stops such advancement by abutment with the closed end of the notch 32 at a point in which the latch means of the two coupling means (to be described more fully below) are in alignment.

The first coupling means 14 further comprises an elongate rearwardly opening housing 28 rigidly affixed directly to the tractor 10 in any suitable manner in place of the conventional drawbar. Housing 28 encloses a double acting piston and cylinder assembly 34 and at least partially encloses a universal joint assembly 36 depending on the position of piston and cylinder assembly 34. The universal joint assembly is connected at its forward end to the free end of the piston rod 38 and at its rear end to a rigid latch control element 40 telescopically mounted in the male member 24.

Male member 24 serves as the latch carrying member of the first coupling means, and the telescoping movement of element 40 therein effected by the piston and cylinder assembly 34 operates the latch means. At this point it is noted that the term "longitudinal" as used herein will refer generally to the lengthwise direction of the coupling means or to the direction extending between tractor 10 and trailer 12 unless otherwise noted. It should be appreciated that, in some applications of the present invention, the longitudinal direction may have a substantial vertical component. The terms "transverse" and "lateral," unless otherwise noted, will refer to directions, whether vertical, horizontal, or angled, extending generally crosswise of the longitudinal direction.

It can be seen that the latch control element 40, being connected to piston rod 38 via the universal joint assembly 36, can be extended and retracted in a longitudinal path with respect to latch carrying member 24. Referring now to FIGS. 6–8 in conjunction with FIGS. 2–5, it will be seen that the latch carrying member 24 has a pair of opposed lateral apertures 42 in respective ones of its side walls. Each side wall further has forward and rearward notches 44 and 46 respectively countersunk from the forward and rearward edges respectively of its aperture 42. A forward key 48 is seated in notches 44 and extends transversely through member 24 and rearwardly into each of the apertures 42. A rear key 50 is seated in notches 46 and extends transversely through male member 24 parallel to key 48 and also extends forwardly into each of the apertures 42. The keys 48 and 50 have respective tongues 48a and 50a which lie between the side walls of member 24 to hold the keys in place laterally.

A pair of dogs 52 are slidably mounted on the keys 48 and 50. Each dog 52 is sized to pass through the adjacent aperture 42 and has a forward keyway 54 to receive forward key 48 and a rear keyway 56 to receive rear key 50. Thus, dogs 52 guided by the keys 48 and 50 can reciprocate laterally toward and away from each other in a horizontal path transverse to that of the latch control element 40.

The latch control element 40 has a substantially solid forward section which is connected to the universal joint assembly 36 and a hollow rear section which is linked to the dogs 52. The rear section comprises upper and lower walls 41 and 43 connected by a rear end wall 45 but no side walls. Each of the dogs 52 has a pin 58 extending therethrough. The pins 58 are disposed vertically and thus extend transversely with respect to each of the two paths of the element 40 and dogs 52. Each pin 58 is constrained to move with its respective dog 52 in the transverse path of the latter. The hollow rear section of latch control element 40 has a pair of elongate slots 60 and 62 in its upper wall 41 inclined rearwardly and laterally inwardly toward each other. Thus, slots 60 and 62 lie generally in a plane substantially parallel to each of the two paths of latch control element 40 and dogs 52 and are inclined in that plane with respect to each of those two paths. Each of the slots 60 and 62 slidably receives the upper end of a respective one of the pins 58. The bottom wall 43 of the hollow section of latch control element 40 also has a pair of slots, one of which is shown at 64, each parallel to a respective one of the slots 60 and 62 and receiving the lower end of a respective one of the pins 58.

When the piston and cylinder assembly 34 is in its fully contracted position, as shown in FIG. 3, the dogs 52 are disposed at least partially within the latch carrying member 24 and also at least partially within the latch control member 40, and the pins 58 are disposed near the rear ends of their respective slots 60 and 62 and the corresponding slots in wall 43. Thus, as the latch control element 40 is extended rearwardly, each dog 52 is cammed laterally outwardly through a respective open side of latch control member 40, and into the respective aperture 42 in the latch carrying member 24 and a respective aligned side aperture 68 in the female member 26, i.e. into the position shown in FIG. 8, whereby members 24 and 26 are latched against relative longitudinal movement and coupling of tractor 10 and trailer 12 is thus accomplished.

It will be appreciated that the dogs 52 will be in their outer or second position when the pins 58 have reached the outer or forward ends of their respective slots 60 and 62. However, pins 58 then move into respective recesses 70 and 72 in the upper wall 41 of the hollow section of element 40 and into respective parallel recesses in the lower wall 43 of the hollow section of element 40. The recesses 70 and 72 are continuous with respective ones of the slots 60 and 62, as are the recesses and slots in the lower wall of element 40. Each of the recesses extends forwardly from its respective slot parallel to the path of latch control element 40. Thus, when the pins 58 have reached the forward or outer ends of their slots, they may pass into their respective recesses permitting further extension of latch control element 40 while retaining the dogs 52 in their outer position. This permits a bracing fork 74, sized to be closely received between the dogs 52 in their outer position, to enter the area between the dogs with the forward key 48 passing between the tines of the fork. Fork 74 braces the dogs 52 to help prevent dislodgment or damage to the dogs if, for example, they should be accidentally struck from the outside by a foreign object. The longitudinal recesses receiving the pins 58 similarly allow the fork 74 to retract from the area between the dogs 52 before the dogs begin to move inwardly during uncoupling.

Referring again to FIGS. 2–5, it can be seen that a lug 76 is rigidly affixed to the upper surface of latch control element 40 and extends upwardly therefrom. As the latch control member 40 is extended from the position of FIG. 3 to the position of FIG. 4, the lug 76 passes along a forwardly opening longitudinal slot 78 in the latch carrying member 24 and also along the notch 32 in female member 26. The various parts are sized and spaced so that when coupling has been effected and the fork 74 has reached its bracing position the lug 76 will be abutting the closed rear end of the slot 78. Thus, lug 76 and slot 78 serve as a second stop means to prevent further relative movement of the latch control element 40 with respect to the latch carrying member 24 upon further extension of the piston and cylinder assembly 34. Rather, the extendable assembly comprising the latch control element 40, the latch carrying member, and the universal joint assembly 36 may now be extended as a unit.

A solenoid 80 is mounted on the forward surface of lug 76. A horizontal, transverse key 82 is carried by the reciprocating part of the solenoid 80. When the latch control element 40 has reached the position shown in FIG. 4, the key 82 may drop down behind a transverse shoulder 84 on the upper surface of the latch carrying member 24. For simplification, the key 32 has been shown as one which would simply drop by gravity. However, it could be spring loaded downwardly as is well known in the art. Thus, if the piston and cylinder assembly 34 should be retracted, forward movement of the latch control element 40 with respect to the latch carrying member 24 will be prevented so that the tractor and trailer will not become accidentally uncoupled. Rather the universal joint will be transformed into a rigid connection as explained more fully below.

It can be appreciated that the positive guidance provided for the dogs 52 and connected pins 58 by the keys 48 and 50 helps to eliminate the possibility of jamming, disloging or misaligning of these parts during operation of the coupling apparatus. Further positive guidance is provided by the reception of the pins 58 in the slots of the latch control element 40. Jamming is further precluded by the fact that there is no pivotal movement of the pins 58 which serve as the cam members for the dogs and by the fact that these pins are securely retained in place by the latch control element. It can also be seen that the dogs, pins, and hollow section of the latch control element are all disposed within the hollow male member 24 when the latch means are not engaged so that these relatively moving parts are protected against dirt, physical shock, rain, etc.

Referring now to FIG. 9 in conjunction with FIGS. 2–5, the universal joint assembly 36 will be described in further detail. Assembly 36 comprises a clevis component 86 having at its forward end a pair of vertically spaced limbs 86a and at its rear end a pair of horizontally spaced 86b. Piston rod 38 has an eyelet 38a at its rear or free end which is received between the limbs 86a. A vertical pin 88 extends through the limbs 86a and eyelet 38a and is retained therein in any suitable manner so that pivotal movement is permitted between the piston rod 38 and clevis component 86 about a first generally vertical axis a. Pin 88 also extends beyond clevis component 86 so that its ends may ride in longitudinally extending raceways 90 formed in the interior of the housing 28. This guides the universal joint assembly in its longitudinal movement and helps to prevent it from jamming in the housing 28.

The universal joint assembly further comprises a pin component 92. Pin component 92 has an eyelet 92a at its forward end which is received between the limbs 86b. A pin 94 extends through the limbs 86b and eyelet 92a. and is retained therein in any suitable manner so that relative pivotal movement of the clevis component 86 and pin component 96 about a second transverse horizontal axis b is permitted. The rear end of pin component 92 is loosely threaded into the solid forward section of the latch control element 40 to permit relative pivotal movement about a longitudinal horizontal axis c accompanied by slight relative longitudinal movement between component 92 and element 40. Thus, unless the universal joint assembly is locked by housing 28, it permits full universal movement, i.e. movement about three mutually perpendicular axes, between the latching mechanism 24, 40, 52 and the housing 28 and, therefore, when the latching means are engaged, between the tractor 10 and trailer 12. The rear edge of each wall of housing 28 is bevelled, see e.g. 95 in FIG. 2, to cooperate with pin 88 and raceways 90 in guiding and aligning the universal joint, especially during retraction.

The provision of the openings 96 also causes the rear portion of housing 28 to form a clevis-like structure. Aligned apertures 97 are provided through the upper and lower walls of the housing 28 in the area adjacent the openings 96 so that, if the universal joint assembly and attached latching mechanism are removed, the housing 28 can be used as a conventional drawbar.

In using the coupling apparatus, it is usually desirable that the universal joint assembly be locked against such pivotal movement until after the latching means have been engaged. Thus, in the initial position shown in FIG. 3, the universal joint is disposed substantially entirely within the rectangular housing 28. The side walls of the housing 28 therefore prevent pivoting about axis a; the top and bottom walls of housing 28 prevent pivoting about axis b; and the interengagement of the inner surfaces of housing 28 and the exterior surfaces of element 40, both of which are rectangular in cross section, prevent pivoting about axis c.

After coupling has been completed, the universal joint assembly is in the position shown in FIG. 4. While it has moved rearwardly somewhat with respect to housing 28 all of the universal joint components and the forward end of element 40 are still disposed deep enough in the housing 28 to prevent any pivotal movement. At this point, lug 76 has engaged the end of slot 78 so that the entire extendable assembly 24, 40, 36 can be extended as a unit. During such extension, the universal joint assembly is moved out of the housing until pin 88 engages the shoulders 91 formed at the ends of raceways 90 are shown in FIG. 5. In this position, the element 40 and threadedly connected pin component 92 are completely free of housing 28 so that movement about axis c is permitted. Clevis limbs 86b are also free of the housing 28 so that pivoting about axis b is also permitted. Clevis limbs 86a are still disposed in the housing. However, the side walls of housing 28 are cut away adjacent the open rear end of the housing and continuous therewith as shown at 96 in FIG. 2. Thus, pivoting about axis a is also permitted even though clevis limbs 86a are still disposed within the housing 28. The use of the cut outs 96 shortens the piston stroke necessary to completely free the universal joint assembly and thus makes the joint and housing combination more compact in the free joint position. The engagement of pin 88 with shoulders 91 also allows the load of trailer 12 to be placed on the housing rather than on the universal joint or piston and cylinder assembly.

If the piston 38 should be retracted, as by accidental operation of the valve 18, while the apparatus is in the position shown in FIG. 5, the trailer will not be uncoupled due to the engagement of key 82 with shoulder 84. Thus, the extendable assembly 24, 40, 36 as a unit will be retracted and the universal joint assembly 36 will be drawn into housing 28 locking it against its pivotal movement. This will cause a braking action on the tractor alerting the driver to the malfunction. It will also be appreciated that in some instances, as in connecting a number of barges together, a rigid rather than a universal connection is desired and therefore the extendable assembly may be deliberately retracted to the position of FIG. 4 with the same result as if the valve 18 had been inadvertently operated.

When it is desired to uncouple the trailer, the piston rod 38 may first be retracted so that the parts are in the position shown in FIG. 4. Solenoid 80 is then operated to raise the key 82. Further retraction of the piston rod 38 then retracts the latch control element 40 with respect to member 24 releasing the latch means 52, 68. The tractor 10 may then be driven forward to remove the male member 24 from the female member 26.

In some instances, namely those in which the drawn vehicle or object is still loading the coupling apparatus, mere operation of the solenoid 80 to raise the key 82, together with forward motion of the tractor 10, will effect unlatching. This is due to the fact that the latch carrying member 24 will tend to remain in place in the female member 26 while, with key 82 raised, the latch control element 40 may move forward with respect to member 40 along with the tractor 10. Further forward movement of the tractor will then serve to remove the male member 24 from the female member 26. The piston and cylinder assembly 34 may then be used to draw the universal joint assembly 36 back into the housing 28.

The above description pertains to one preferred embodiment of the invention. However, numerous variations of this embodiment will suggest themselves to those skilled in the art without departing from the spirit of the invention. It is therefore intended that the scope of the invention be limited only by the claims which follow.

I claim:

1. Coupling apparatus for coupling first and second objects together and including:
   first coupling means carried by said first object and comprising:
   a housing rigidly affixed to said first object;
   a latching assembly carried by said housing and including first latch means;
   a universal joint assembly carried by said housing and connected to said latching assembly for providing pivotal movement of said latching assembly with respect to said first object about first, second and third generally mutually perpendicular axes; and
   drive means carried by said housing and connected to said universal joint assembly for longitudinally extending and retracting said universal joint assembly with respect to said housing between a first joint position in which said universal joint assembly is locked against said pivotal movement by said universal joint control assembly and a second joint position in which said universal joint assembly is freed for said pivotal movement; and
   second coupling means carried by said second object and comprising second latch means, said first latch means being automatically engageable with said second latch means to effect coupling of said first and second objects.

2. The coupling apparatus of claim 1 wherein said housing has an open end permitting extension and retraction of said universal joint assembly from the interior of said housing, said housing generally surrounding said universal joint in said first joint position and said universal joint assembly extending at least partially outwardly of said housing in said second joint position.

3. The coupling apparatus of claim 2 wherein said universal joint assembly comprises first, second and third pivot means for providing said pivotal movement about said first, second and third axes respectively.

4. The coupling apparatus of claim 3 further comprising alignment means cooperative between said universal joint assembly and said housing to guide said universal joint assembly in its movement between said first joint position and said second joint position.

5. The coupling apparatus of claim 4 wherein said alignment means comprises means within said housing defining a longitudinal raceway and means projecting laterally from said universal joint assembly and into said raceway.

6. The coupling apparatus of claim 4 wherein said alignment means comprises laterally and longitudinally tapered surfaces on one of said universal joint assembly and housing and engageable with the other.

7. The coupling apparatus of claim 3 wherein said first axis is disposed transverse to said housing, said first pivot means is disposed innermost in said housing in said first joint position, and said housing has a first pair of opposed lateral openings therethrough continuous with said open end of said housing and opening transverse to said first axis, said first pivot means being disposed at least partially within said housing adjacent said openings in said second joint position.

8. The coupling apparatus of claim 7 wherein said housing has a second pair of opposed lateral openings therethrough adjacent to and opening traverse to said first pair of lateral openings whereby said housing forms a clevis structure adjacent said lateral openings.

9. The coupling apparatus of claim 2 wherein said drive means is disposed within said housing intermediate said universal joint assembly and said first object.

10. The coupling apparatus of claim 1 wherein said latching assembly has a free end portion defining a clevis structure.

11. Coupling apparatus for coupling first and second objects together and including:
   first coupling means carried by said first object and comprising:

a latch carrying member affixed to said first object;

latch control means mounted on said latch carrying member for telescopic movement with respect thereto in a first path extending generally longitudinally with respect to said first object;

guide means carried by said latch carrying member;

first latch means slidably mounted on said guide means for reciprocation in a second path extending generally transverse to said first path;

linking means attached to one of said latch control means and said first latch means and engageable with the other to move said first latch means along said second path between a first latch position and a second latch position upon movement of said latch control means along said first path;

drive means for moving said latch control means in said first path; and second coupling means carried by said second object and comprising second latch means, said first latch means being automatically engageable with said second latch means as said first latch means is moved from said first latch position to said second latch position to effect coupling of said first and second objects.

12. The coupling apparatus of claim 11 wherein said latch carrying member is interengageable with said second coupling means upon advancement of one of said objects toward the other to align said first and second coupling means and further comprising first stop means cooperative between said latch carrying member and said second coupling means for limiting said advancement at a point at which said first and second latch means are aligned.

13. The coupling apparatus of claim 12 wherein said latch carrying member is a hollow male member, wherein said latch control means is disposed at least partially within said latch carrying member, and wherein said second coupling means comprises a female member for receipt of said male member.

14. The coupling apparatus of claim 13 wherein said latch control means comprises a rigid latch control element, wherein said first latch means comprises at least one male latch element, and wherein said linking means comprises a cam member connected to and movable with one of said elements and extending between said elements generally transversely to each of said two paths, the other of said elements having an elongate slot slidably receiving said cam member, said slot being disposed generally in a plane parallel to each of said two paths and inclined in said plane with respect to each of said two paths.

15. The coupling apparatus of claim 14 wherein said slot is disposed in said latch control element and wherein said cam member comprises a pin carried by said male latch element.

16. The coupling apparatus of claim 15 further comprising another such male latch element and another such pin carried by said other male latch element, and wherein said latch control element has another such slot slidably receiving said other pin, said male latch elements being reciprocable toward and away from each other in said second path.

17. The coupling apparatus of claim 16 wherein said latch control element comprises a hollow section, wherein said male latch elements in said first latch position are disposed at least partially within said latch carrying member and at least partially within said hollow section of said latch control element, wherein said hollow section has a pair of opposed lateral openings for passage of respective ones of said male latch elements, wherein said latch carrying member has a pair of opposed lateral apertures each aligned with a respective one of said male latch elements, wherein said second latch means comprises means defining a pair of opposed lateral apertures through said female member each aligned with a respective one of the apertures of said latch carrying member when said first stop means are engaged, and wherein each of said male latch elements in siad second latch position is disposed partially within the aligned one of the apertures of said latch carrying member and partially within the respective one of the apertures of said female member whereby withdrawal of said latch carrying member from said female member is prevented.

18. The coupling apparatus of claim 17 wherein said latch control means further comprises bracing means extending longitudinally into and fixed with respect to said hollow section of said latch control element and sized to be received between said male latch elements in said second latch position.

19. The coupling apparatus of claim 18 wherein said latch control element has a pair of recesses generally parallel to said first path and each continuous with a respective one of said slots for receipt of respective ones of said pins when said male latch elements are in said second latch position whereby said latch control element is permitted to move partially along said first path while maintaining said male latch elements in said second latch position to move said bracing means into and out of the area between said male latch elements.

20. The coupling apparatus of claim 12 wherein said first coupling means further comprises a universal joint assembly and a universal joint control assembly, one of said assemblies being longitudinally fixed with respect to said first object, and the other of said assemblies being connected to said drive means and longitudinally extendable and retractable by said drive means with respect to said first object between a first joint position relative to said one assembly in which said universal joint is locked against universal movement and a second joint position in which said universal joint is freed to permit universal movement between said latch carrying member and said first object.

21. The coupling apparatus of claim 20 wherein said one assembly is said universal joint control assembly and said other assembly is said universal joint assembly, said universal joint assembly interconnecting said latch control means and said drive means.

22. The coupling apparatus of claim 21 wherein extension of said universal joint assembly and said latch control means by said drive means effects said movement of said first latch means to its second latch position, and further comprising second stop means cooperative between said latch carrying member and said latch control means to limit relative movement of said latch carrying member and said latch control means and permit movement of said latch carrying member, said latch control means and said universal joint assembly as a unit upon further extension by said drive means.

23. The coupling apparatus of claim 22 wherein said universal joint assembly is moved to said second joint position during said further extension by said drive means.

24. The coupling apparatus of claim 23 further comprising safety means for selectively locking said latch control means against movement relative to said latch carrying member upon retraction by said drive means when said first latch means is in said second latch position.

* * * * *